US008557386B2

(12) United States Patent
Sawant et al.

(10) Patent No.: US 8,557,386 B2
(45) Date of Patent: Oct. 15, 2013

(54) SELECTIVELY STRIPPABLE INTERMEDIATE COATINGS AND METHODS OF USE

(75) Inventors: Suresh G. Sawant, Stevenson Ranch, CA (US); Chandra B. Rao, Valencia, CA (US); Srintorn Charonsuck, Paramount, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 1603 days.

(21) Appl. No.: 10/990,621

(22) Filed: Nov. 17, 2004

(65) Prior Publication Data

US 2006/0106161 A1 May 18, 2006

(51) Int. Cl.
*B32B 27/06* (2006.01)
*B32B 27/36* (2006.01)

(52) U.S. Cl.
USPC ............... 428/413; 428/423.15; 428/423.5; 428/474.4

(58) Field of Classification Search
USPC .................. 428/413, 423.1, 423.5, 474.4
See application file for complete search history.

(56) References Cited

U.S. PATENT DOCUMENTS

| | | | |
|---|---|---|---|
| 3,251,708 A | 5/1966 | Schmetterer et al. | 117/71 |
| 3,979,540 A * | 9/1976 | Moffett | 428/159 |
| 4,590,097 A | 5/1986 | Booth et al. | 427/154 |
| 5,091,572 A * | 2/1992 | Speranza et al. | 564/139 |
| 5,393,849 A * | 2/1995 | Srinivasan et al. | 525/425 |
| 5,726,281 A * | 3/1998 | Nojiri et al. | 528/335 |
| 6,500,912 B1 | 12/2002 | Corley | 528/113 |
| 2001/0051256 A1 | 12/2001 | Silagy et al. | 428/212 |
| 2002/0183479 A1* | 12/2002 | Rulkens et al. | 528/310 |

FOREIGN PATENT DOCUMENTS

| | | |
|---|---|---|
| WO | WO98/13148 | 4/1998 |
| WO | WO99/47613 | 9/1999 |

OTHER PUBLICATIONS

DeSoto Aerospace Coatings, "technical data—F565-series intermediate coats", Sep. 1999; pp. 1-2, PRC-DeSoto Europe, Ltd., Shildon, England.
PPG Aerospace, "Technical Data—F565-4010 (US Version)", Jan. 2006; pp. 1-2, PRC-DeSoto, PPG Aerospace US (800) AEROMIX.
PRC-DeSoto International , Inc., "Material Safety Data Sheet—F565-4010 Intermediate Coat Light Gray (US)", Sep. 26, 2005, pp. 1-9, PRC-DeSoto International, Inc., A PPG Industries Company, Glendale, California 91209, USA.
PRC-DeSoto International , Inc., "Material Safety Data Sheet—020K026 Intermediate Primer Reducer", Jul. 14, 2004, pp. 1-9, PRC-DeSoto International, Inc., A PPG Industries Company, Glendale, California 91209, USA.
DeSoto Aerospace Coatings, "technical data—F565-series intermediate coats", Sep., 1999; pp. 1-2, PRC-DeSoto Europe, Ltd., Shildon, England.
PPG Aerospace, "Technical Data—F565-4010 (US Version)", Jan., 2006; pp. 1-2, PRC-DeSoto, PPG Aerospace US (800) AEROMIX.
PRC-DeSoto International, Inc., "Material Safety Data Sheet—F565-4010 Intermediate Coat Light Gray (US)", Sep. 26, 2005, pp. 1-9, PRC-DeSoto International, Inc., A PPG Industries Company, Glendale, California 91209, USA.
Blackford, Roger, "Development of Selectively Strippable Aerospace Exterior Coatings in Combination with Stripper Developments", pp. 111-121, Courtaulds Aerospace, Shildon, England.
Blackford, Roger, "Presentation Abstract—Paint Stripping: The Future", Sep. 2, 1996, SAE International, Warrendale, Pennsylvania 15096-0001, USA.
Blackford, Roger, "Paint Stripping—The Future", pp. 1-9, Courtaulds Aerospace.
Blackford, Roger, "Selective Strippability", SAE Technical Paper Series 941240, Mar. 14-17, 1994, pp. 1-9, SAE International, Warrendale, Pennsylvania 15096-0001, USA.
PRC-DeSoto International, Inc., "Material Safety Data Sheet—020K026 Intermediate Primer Reducer", Jul. 14, 2004, pp. 1-9, PRC-DeSoto International, Inc., A PPG Industries Company, Glendale, California 91209, USA.
PRC-DeSoto International, Inc., "Material Safety Data Sheet—F275-0189 Activator (US)", May 11, 2005, PRC-DeSoto International, Inc., A PPG Industries Company, Glendale, California 91209, USA.
Blackford, Roger, "Environmental and Economic Benefits of Selective Removal of Paint", pp. 1-14, PRC-DeSoto International.

\* cited by examiner

*Primary Examiner* — Terressa Boykin
(74) *Attorney, Agent, or Firm* — William Lambert

(57) ABSTRACT

Selectively strippable coating compositions comprising at least one amine-terminated polyamide are disclosed. Multilayer coatings formed from the selectively strippable coating compositions, and methods of using coating compositions comprising at least one amine-terminated polyamide to facilitate selective removal of an adjoining coating by a stripper are also disclosed.

59 Claims, No Drawings

SELECTIVELY STRIPPABLE INTERMEDIATE COATINGS AND METHODS OF USE

This disclosure relates to selectively strippable coating compositions comprising at least one amine-terminated polyamide, to multi-layer coatings comprising a selective strippable intermediate coating, and to methods of using the coating compositions and intermediate coatings to facilitate selective removal of an adjoining coating by a stripper.

Surfaces of aviation and aerospace vehicles are typically coated with a multi-layer coating. For example, aviation and aerospace coatings can include an anticorrosive primer, a base coat, and a top coat. In certain multi-layer coatings, a tie coat can also be used between any of the coating layers to enhance the interlayer adhesion. When an aviation or aerospace vehicle is to be repainted, at least the top coat can be removed prior to application of a new top coat. A top coat can be removed, for example, by mechanically abrading the top coat or can be removed by stripping the top coat using a stripper. Strippers used to remove a top coat can be based, for example, on aqueous benzyl alcohol solutions, chlorinated solvents, environmental strippers, or surfactant-containing aqueous solutions.

When preparing a multi-layer coating for repainting, it can be useful to remove the top coat without removing at least some of the underlying coating layers. It is particularly desirable that the primer coating not be removed to avoid having to dispose of the primer coating which can include toxic compounds such as chromate, and/or avoid having to re-prime the substrate on which the multi-layer coating is disposed. To facilitate removing a top coat layer without also removing an underlying primer coating, intermediate coatings can be used between the top coat and the underlying coating layers.

There remains a need for film-forming selectively strippable intermediate coatings that can be applied from low VOC ("Volatile Organic Content") formulations and which are useful with coatings used in the aviation and aerospace industry.

DEFINITIONS USED IN THE PRESENT DISCLOSURE

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth herein are approximations that can vary depending upon the desired properties to be obtained.

In this application, the use of the singular includes the plural unless specifically stated otherwise. In this application, the use of "or" means "and/or" unless stated otherwise. Furthermore, the use of the term "including", as well as other forms, such as "includes" and "included", is not limiting.

"Alkyl" refers to a saturated or unsaturated, branched, straight-chain or cyclic monovalent hydrocarbon group derived by the removal of one hydrogen atom from a single carbon atom of a parent alkane, alkene or alkyne. The term "alkyl" is specifically intended to include groups having any degree or level of saturation, i.e., groups having exclusively single carbon-carbon bonds, groups having one or more double carbon-carbon bonds, groups having one or more triple carbon-carbon bonds and groups having mixtures of single, double and triple carbon-carbon bonds. In certain embodiments, an alkyl group comprises from 1 to 12 carbon atoms. In other embodiments, an alkyl group comprises from 1 to 6 carbon atoms.

"Alkylene" refers to a saturated or unsaturated, branched, straight-chain or cyclic divalent hydrocarbon group derived by the removal of two hydrogen atoms from one or two carbon atoms of a parent alkane, alkene or alkyne. The term "alkylene" is specifically intended to include groups having any degree or level of saturation, i.e., groups having exclusively single carbon-carbon bonds, groups having one or more double carbon-carbon bonds, groups having one or more triple carbon-carbon bonds and groups having mixtures of single, double and triple carbon-carbon bonds. In certain embodiments, an alkylene group comprises from 2 to 12 carbon atoms.

"Amine" refers to the radical —$NH_2$, and —NR'R" wherein R' and R" are independently selected from H, $C_{1-10}$ alkyl, substituted $C_{1-10}$ alkyl, $C_{1-10}$ heteroalkyl, and substituted $C_{1-10}$ heteroalkyl, as defined herein.

"Aryl" refers to a monovalent aromatic hydrocarbon group derived by the removal of one hydrogen atom from a single carbon atom of a parent aromatic ring system. In certain embodiments, an aryl group can comprise from 5 to 12 carbon atoms.

"Arylene" refers to a divalent aromatic hydrocarbon group derived by the removal of two hydrogen atoms from one or two carbon atoms of a parent aromatic ring system. In certain embodiments, an arylene group can comprise from 5 to 12 carbon atoms.

"Arylalkyl" refers to an acyclic alkyl group in which one of the hydrogen atoms bonded to a carbon atom, typically a terminal or $sp^3$ carbon atom, is replaced with an aryl group. In certain embodiments, an arylalkyl group can be $C_{6-24}$ arylalkyl, e.g., the alkyl moiety of the arylalkyl group can be $C_{1-12}$ and the aryl moiety can be $C_{5-12}$.

"Arylalkylene" refers to a divalent group derived by replacing one of the hydrogen atoms of an aryl group with an alkyl group, or derived by replacing two of the hydrogen atoms of an aromatic group with alkyl groups. In certain embodiments, an arylalkylene group can be $C_{6-24}$ arylalkylene, e.g., the alkyl moiety or moieties of the arylalkylene group can be $C_{1-12}$ and the aryl moiety can be $C_{5-12}$.

"Cyano" refers to the radical —CN.

"Cycloalkyl" refers to a saturated or unsaturated cyclic alkyl group. In certain embodiments, a cycloalkyl group can be $C_{5-12}$ cycloalkyl.

"Cycloalkylene" refers to a saturated or unsaturated cyclic alkylene group. In certain embodiments, a cycloalkylene group can be $C_{5-12}$ cycloalkylene.

"Cycloalkylayl" refers to an acyclic alkyl group in which one of the hydrogen atoms bonded to a carbon atom, typically a terminal or $sp^3$ carbon atom, is replaced with a cycloalkyl group. In certain embodiments, a cycloalkylalkyl group can be $C_{6-24}$ cycloalkylalkyl, e.g., the alkyl moiety of a cycloalkylalkyl group can be $C_{1-12}$ and the cycloalkyl moiety can be $C_{5-12}$.

"Cycloalkylalkylene" refers to a divalent group derived by replacing one of the hydrogen atoms of a cycloalkyl group with an alkyl group, or derived by replacing two of the hydrogen atoms of a cyclic alkane, alkene, or alkynyl moiety with alkyl groups. In certain embodiments, a cycloalkylalkylene group can be $C_{6-24}$ cycloalkylalkylene, e.g., the alkyl moiety or moieties of a cycloalkylalkyl group can be $C_{1-12}$ and the cycloalkyl moiety can be $C_{5-12}$.

"Halogen" refers to a fluoro, chloro, bromo or iodo group.

"Heteroalkyl" refers to an alkyl group in which one or more of the carbon atoms and/or any associated hydrogen atoms is each independently replaced with the same or different heteroatomic groups, wherein an alkyl group is defined herein.

"Heteroalkylene" refers to an alkylene group in which one or more of the carbon atoms and/or any associated hydrogen atoms is each independently replaced with the same or different heteroatomic groups, wherein an alkylene group is defined herein. In certain embodiments, a heteroaryl group can be derived from a $C_{2\text{-}12}$ alkylene.

"Heteroaryl" refers to an aryl group in which one or more of the carbon atoms and/or any associated hydrogen atoms are each independently replaced with the same or different heteroatomic groups, wherein an aryl group is defined herein. In certain embodiments, a heteroaryl group can be derived from a $C_{5\text{-}12}$ aryl.

"Heteroarglene" refers to an arylene group in which one or more of the carbon atoms and/or any associated hydrogen atoms are each independently replaced with the same or different heteroatomic groups, wherein an arylene group is defined herein. In certain embodiments, a heteroarylene group can be derived from a $C_{5\text{-}12}$ arylene.

"Heteroarylalkyl" refers to an arylalkyl group in which one or more of the carbon atoms and/or any associated hydrogen atoms are each independently replaced with the same or different heteroatomic groups, wherein an arylalkyl group is defined herein. In certain embodiments, a heteroarylalkyl group can be derived from a $C_{6\text{-}24}$ arylalkyl.

"Heteroarylalkylene" refers to an arylalkylene group in which one or more of the carbon atoms and/or any associated hydrogen atoms are each independently replaced with the same or different heteroatomic groups, wherein an arylalkylene group is defined herein. In certain embodiments, the heteroarylalkylene group can be derived from a $C_{6\text{-}24}$ arylalkylene.

"Heteroatomic groups" include, but are not limited to, —O—, —S—, —N—, —P—, —Si—, —O—O—, —S—S—, —O—S—, —NR'—, =N—N=, —N=N—, —N=N—NR'—, —PH—, —P(O)$_2$—, —O—P(O)$_2$—, —S(O)—, —S(O)$_2$—, and the like, wherein R' is hydrogen, alkyl, substituted alkyl, cycloalkyl, substituted cycloalkyl, aryl or substituted aryl.

"Heterocycloalkyl" refers to a cycloalkyl group in which one or more of the carbon atoms and/or any associated hydrogen atoms are each independently replaced with the same or different heteroatomic groups, wherein a cycloalkyl group is defined herein. In certain embodiments, the heterocycloalkyl group can be derived from a $C_{6\text{-}24}$ cycloalkyl.

"Heterocycloalkylene" refers a cycloalkylene group in which one or more of the carbon atoms and/or any associated hydrogen atoms are each independently replaced with the same or different heteroatomic groups, wherein a cycloalkylene group is defined herein. In certain embodiments, a heterocycloalkylene group can be derived from a $C_{6\text{-}24}$ cycloalkylene.

"Heterocycloalkylalkyl" refers to a cycloalkylalkyl group in which one or more of the carbon atoms and/or any associated hydrogen atoms are each independently replaced with the same or different heteroatomic groups, wherein a cycloalkylalkyl group is defined herein. In certain embodiments, a heterocycloalkylalkyl group can be derived from a $C_{6\text{-}24}$ cycloalkylalkyl.

"Heterocycloalkylalkylene" refers to a cycloalkylalkylene group in which one or more of the carbon atoms and/or any associated hydrogen atoms are each independently replaced with the same or different heteroatomic groups, wherein a cycloalkylalkylene group is defined herein. In certain embodiments, a heterocycloalkylalkylene group can be derived from a $C_{6\text{-}24}$ cycloalkylalkylene.

"Substituted" refers to a group in which one or more hydrogen atoms are each independently replaced with the same or different substituent(s). Examples of substituents include, but are not limited to, halogen, —S(O)$_2$OH, —S(O)$_2$, —COOH, —NO$_2$, —NH$_2$, —CN, $C_{1\text{-}6}$ alkyl, —CF$_3$, and —COR''' where R''' is chosen from $C_{1\text{-}6}$ alkyl.

"Sulfonyl" refers to a radical —S(O)$_2$ group.

Coating compositions of the present disclosure can comprise at least one amine-terminated polyamide. Amine-terminated polyamides of the present disclosure can have the structure of Formula (I) or Formula (II):

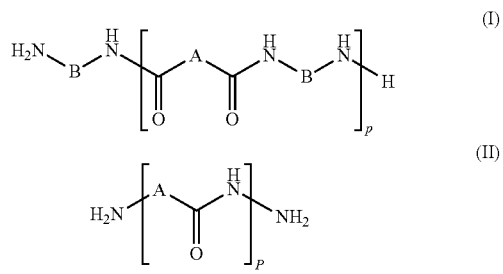

wherein each A is independently chosen from $C_{2\text{-}12}$ alkylene, substituted $C_{2\text{-}12}$ alkylene, $C_{2\text{-}12}$ heteroalkylene, substituted $C_{2\text{-}12}$ heteroalkylene, $C_{5\text{-}12}$ arylene, substituted $C_{5\text{-}12}$ arylene, $C_{5\text{-}12}$ heteroarylene, substituted $C_{5\text{-}12}$ heteroarylene, $C_{5\text{-}12}$ cycloalkylene, substituted $C_{5\text{-}12}$ cycloalkylene, $C_{5\text{-}12}$ heterocycloalkylene, substituted $C_{5\text{-}12}$ heterocycloalkylene, $C_{6\text{-}24}$ cylcloalkylalkylene, substituted $C_{6\text{-}24}$ cycloalkylalkylene, $C_{6\text{-}24}$ heterocycloalkylalkylene, substituted $C_{6\text{-}24}$ heterocycloalkylalkylene, $C_{6\text{-}24}$ arylalkylene, substituted $C_{6\text{-}24}$ arylalkylene, $C_{6\text{-}24}$ heteroarylalkylene, and substituted $C_{6\text{-}24}$ heteroarylalkylene;

each B is independently chosen from $C_{2\text{-}12}$ alkylene, substituted $C_{2\text{-}12}$ alkylene, $C_{2\text{-}12}$ heteroalkylene, substituted $C_{2\text{-}12}$ heteroalkylene, $C_{5\text{-}12}$ arylene, substituted $C_{5\text{-}12}$ arylene, $C_{5\text{-}10}$ heteroarylene, substituted $C_{5\text{-}12}$ heteroarylene, $C_{5\text{-}12}$ cycloalkylene, substituted $C_{5\text{-}12}$ cycloalkylene, $C_{5\text{-}12}$ heterocycloalkylene, substituted $C_{5\text{-}12}$ heterocycloalkylene, $C_{6\text{-}24}$ cylcloalkylalkylene, substituted $C_{6\text{-}24}$ cycloalkylalkylene, $C_{6\text{-}24}$ heterocycloalkylalkylene, substituted $C_{6\text{-}24}$ heterocycloalkylalkylene, $C_{6\text{-}24}$ arylalkylene, substituted $C_{6\text{-}24}$ arylalkylene, $C_{6\text{-}24}$ heteroarylalkylene, and substituted $C_{6\text{-}24}$ heteroarylalkylene.

in certain embodiments of compounds of Formulae (I) and (II), p can be an integer chosen such that the number average molecular weight of the amine-terminated polyamide ranges from 500 Daltons to 100,000 Daltons, in certain embodiments from 500 Daltons to 25,000 Daltons, and in certain embodiments, from 500 Daltons to 5,000 Daltons.

In certain embodiments of compounds of Formulae (I) and (II), each A can be independently chosen from $C_{2\text{-}12}$ alkylene, substituted $C_{2\text{-}12}$ alkylene, $C_{2\text{-}12}$ heteroalkylene, and substituted $C_{2\text{-}12}$ heteroalkylene.

In certain embodiments of compounds of Formulae (I) and (II), each A can be independently chosen from $C_{2\text{-}12}$ alkylene, and $C_{2\text{-}12}$ heteroalkylene.

In certain embodiments of compounds of Formulae (I) and (II), each A can be independently chosen from —NH—R$^6$—NH— and —NH—R$^6$— wherein R$^6$ is chosen from $C_{1\text{-}8}$ alkylene.

In certain embodiments of compounds of Formulae (I) and (II), the at least one substituent group can be chosen from $C_{1-6}$ alkyl, halo, cyano, and sulfonyl.

In certain embodiments of compounds of Formula (I), each B can be independently chosen from $C_{2-12}$ alkylene, substituted $C_{2-12}$ alkylene, $C_{2-12}$ heteroalkylene, and substituted $C_{2-12}$ heteroalkylene.

In certain embodiments of compounds of Formula (I), each B can be independently is chosen from substituted $C_{2-12}$ alkylene having at least one $C_{1-6}$ alkyl substituent group.

In certain embodiments of compounds of Formula (I), each B can be independently chosen from methyl substituted $C_{2-12}$ alkylene.

Amine-terminated polyamides used to form coating compositions of the present disclosure can be prepared by reacting dibasic monomers having ester, acid, acid amide and/or carbamoyl groups, with diamine monomers.

Dibasic monomers used to form amine-terminated polyamides of the present disclosure can have the structure of Formula (III):

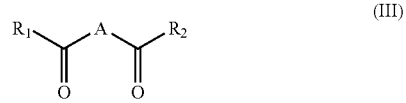

(III)

wherein $R^1$ and $R^2$ are independently chosen from halogen, —OH, —OR$^3$, —NH$_2$, and —NR$^4$R$^5$, wherein $R^3$ is chosen from $C_{1-6}$ alkyl, substituted $C_{1-6}$ alkyl, $C_{1-6}$ heteroalkyl, and substituted $C_{1-6}$ heteroalkyl; and $R^4$ and $R^5$ are independently chosen from H, $C_{1-10}$ alkyl, substituted $C_{1-10}$ alkyl, $C_{1-10}$ heteroalkyl, and substituted $C_{1-10}$ heteroalkyl; and A is chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{2-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene, $C_{6-24}$ heteroarylalkylene, and substituted $C_{6-24}$ heteroarylalkylene.

In certain embodiments of compounds of Formula (III), $R^1$ and $R^2$ are —OH, $R^1$ and $R^2$ are —OCH$_3$, or $R^1$ and $R^2$ are —NH$_2$.

In certain embodiments of compounds of Formula (III), A can be chosen from $C_{2-12}$ alkylene, substituted $C_{2-12}$ alkylene, $C_{2-12}$ heteroalkylene, and substituted $C_{2-12}$ heteroalkylene.

In certain embodiments of compounds of Formula (III), A can be chosen from $C_{2-10}$ alkylene, and $C_{2-10}$ heteroalkylene.

In certain embodiments of compounds of Formula (III), A can be chosen from —NH—R$^6$—NH—, and —NH—R$^6$— where R$^6$ is chosen from a $C_{1-12}$ alkylene.

In certain embodiments of compounds of Formula (III), the at least one substituent group can be chosen from $C_{1-6}$ alkyl, halo, cyano, and sulfonyl.

In certain embodiments, a dibasic monomer can be chosen from a dibasic ester, such as dimethyl ester, fore example, dimethyl adipate, dimethyl glutarate, dimethyl succinate, and the like. Suitable dibasic esters are commercially available from DuPont.

In certain embodiments, a dibasic monomer can be chosen from a dibasic acid, such as petanedioic acid, adipic acid, heptanedioic acid, sebacic acid, nonanedioic acid, and the like.

Diamines used to form amine-terminated polyamides of the present disclosure can have the structure of Formula (IV):

(IV)

wherein B is chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene, $C_{6-24}$ heteroarylalkylene, and substituted $C_{6-24}$ heteroarylalkylene.

In certain embodiments of compounds of Formula (IV), B can be chosen from $C_{2-10}$ alkylene, substituted $C_{2-12}$ alkylene, $C_{2-12}$ heteroalkylene, and substituted $C_{2-10}$ heteroalkylene.

In certain embodiments of compounds of Formula (IV), B can be chosen from a substituted $C_{2-12}$ alkylene having at least one $C_{1-6}$ alkyl substituent group.

In certain embodiments of compounds of Formula (IV), the at least one substituent group can be chosen from $C_{1-6}$ alkyl, halo, cyano, and sulfonyl.

In certain embodiments of compounds of Formula (IV), a diamine monomer can be chosen from a methyl substituted $C_{1-6}$ alkylene diamine, such as for example, 2-methylpentamethylenediamine, butane-1,3-diamine, and the like. Suitable diamines are available, for example, from DuPont under the DYTEK trademark.

In certain embodiments, lactams, including cyclic amides of amiocarboxylic acids, and analogues having unsaturation or heteroatoms replacing one or more carbon atoms of the ring, can be reacted to form amine-terminated polyamides of the present disclosure. In certain embodiments, lactams used to form amine-terminated polyamides of the present disclosure can have the structure of Formula (V):

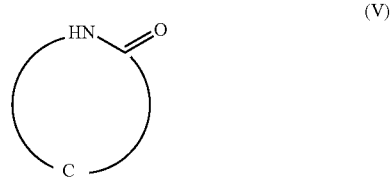

(V)

wherein C is chosen from $C_{2-12}$ alkylene, substituted $C_{2-12}$ alkylene, $C_{2-12}$ heteroalkylene, substituted $C_{2-12}$ heteroalkylene, $C_{6-20}$ cycloalkylalkylene, substituted $C_{6-20}$ cycloalkylalkylene, $C_{6-20}$ heterocycloalkylalkylene, $C_{6-20}$ heterocycloalkylalkylene, $C_{6-20}$ arylalkylene, $C_{6-20}$ substituted arylalkylene, $C_{6-20}$ heteroarylalkylene, and substituted $C_{6-20}$ heteroarylalkylene.

In certain embodiments of compounds of Formula (V), C can be chosen from $C_{2-12}$ alkylene, substituted $C_{2-12}$ alkylene, $C_{2-12}$ heteroalkylene, substituted $C_{2-12}$ heteroalkylene.

In certain embodiments of compounds of Formula (V), C can be chosen from a substituted $C_{2-12}$ alkylene having at least one $C_{1-6}$ alkyl substitute group.

In certain embodiments of compounds of Formula (V), the at least one substituent group can be chosen from $C_{1-6}$ alkyl, halogen, cyano, and sulfonyl.

In certain embodiments, amino acids useful for forming amine-terminated polyamides of the present disclosure have the structure of Formula (VI):

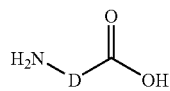

(VI)

wherein D is chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{2-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene, $C_{6-24}$ heteroarylalkylene, and substituted $C_{6-24}$ heteroarylalkylene.

Amine-terminated polyamides of the present disclosure can be formed by reacting one or more types of monomers. For example, amine-terminated polyamides can be formed by reacting one types of dibasic monomers with one or more types of diamines, or one or more types of lactams can be reacted. In certain embodiments, amine-terminated polyamides of the present disclosure can include one or more terminal amine groups.

Amine-terminated polyamides of the present disclosure can be formed by reacting dibasic monomers of Formula (III) with diamine monomers of Formula (IV). Dibasic monomers used to form amine-terminated polyamides of the present disclosure can have the same structure or can be mixtures of different dibasic monomers. Similarly, diamine monomers used to form amine-terminated polyamides of the present disclosure can have the same structure or can be mixtures of different diamine monomers. To form an amine-terminated polyamide of the present disclosure, p moles of a dibasic monomer, or a mixture of dibasic monomers, can be reacted with p+1 moles of a diamine monomer, or a mixture of diamine monomers. A general reaction is shown in Scheme 1:

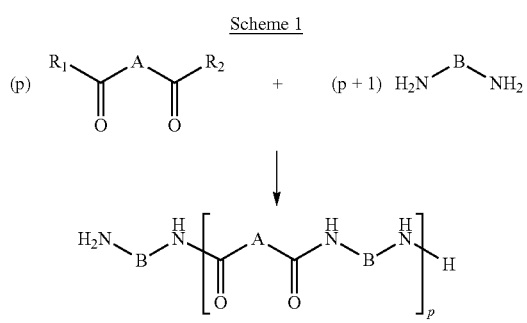

Amine-terminated polyamides of the present disclosure can be formed by reacting at least one diacid halide such as dichlorohalide with at least one diamine as shown in Scheme 2:

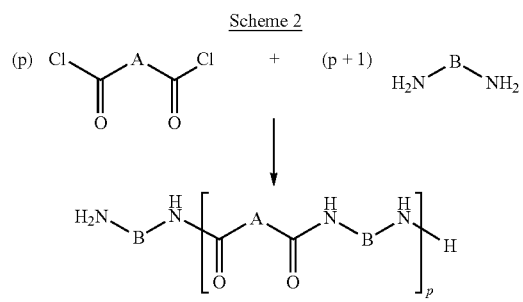

Amine-terminated polyamides of the present disclosure can be formed by reacting at least one lactam as shown in Scheme 3:

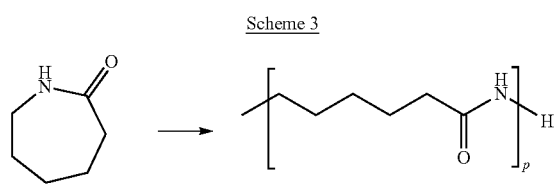

Amine-terminated polyamides of the present disclosure can also be formed by reacting at least one amino acid as shown in Scheme 4:

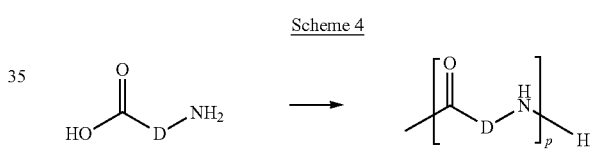

Specific monomers used to form amine-terminated polyamides of the present disclosure can be chosen to produce amine-terminated polyamides that are soluble in at least one solvent, such that the solution of amine-terminated polyamide and solvent exhibits a Volatile Organic Content ("VOC") less than 700 g/L, and in certain embodiments, less than 600 g/L. VOC refers to the amount of volatile organic solvent in a solution or dispersion comprising the amine-terminated polyamide and the solvent. "Solvent" as used herein includes organics, water, cosolvents, and mixtures thereof, and can further include solubilizing and/or dispersing agents. In certain embodiments, amine-terminated polyamides of the present disclosure can be soluble in alcohols such as 1-propanol, isopropanol and ethanol, ethyl acetate, methyl ethyl ketone, tetrahydrofuran, xylene, methyl isobutyl ketone, acetone, 1-methoxy-2-propanol, dimethyl adipate, ethylene glycol, dimethylformamide, chloroform, diacetamide, formic acid, meta-cresols, and/or mixtures thereof. In certain embodiments, amine-terminated polyamides of the present disclosure can be soluble in 1-propanol, isopropanol, and/or ethanol. Amine-terminated polyamides can also be soluble in surfactant-containing aqueous solutions, which can include surfactants, cosolvents, solubilizing agents, and/or dispersing agents.

The relative amounts of monomers used to form amine-terminated polyamides of the present disclosure can be chosen to provide a number average molecular weight of the amine-terminated polyamide product ranging from 500 Daltons to 100,000 Daltons, in certain embodiments from 500 Daltons to 25,000 Daltons, and in certain embodiments from 500 Daltons to 5,000 Daltons. The characteristics of the molecular weight distribution of amine-terminated polyamides can be determined by gel permeation chromatography methods. Low molecular weight amine-terminated polyamides can be soluble in one or more organic solvents such as, for example, any of those disclosed herein, and therefore solutions comprising amine-terminated polyamides can have a lower VOC compared to higher molecular weight resins.

Selectively strippable coating compositions of the present disclosure can comprise at least one amine-terminated polyamide and a solvent as a one-part system. A one-part system can comprise an amine-terminated polyamide of the present disclosure dissolved and/or dispersed in a solvent. A one-part system can optionally include additives and/or fillers. The solids content of the one-part system can range from 1 percent to 50 percent based on the total weight of the total weight of the one-part system. A selectively strippable coating formed using a one-part system may not be cross-linked, or may be internally crosslinked.

Selectively strippable coating compositions comprise at least one amine-terminated polyamide and at least one epoxy curing agent capable of reacting with the terminal amine groups of the amine-terminated polyamide. Useful epoxy curing agents include, for example, hydantoin diepoxide, diglycidyl ethers of bisphenol-A, such as EPON 828 commercially available from Shell Chemical, diglycidyl ethers of bisphenol-F epoxide, novolac-type epoxides, such as DEN 431 commercially available from Shell Chemical, other epoxidized unsaturated and phenolic resins, and mixtures thereof. Depending on the amine-terminated polyamide used, the coating composition can comprise from 90 percent to 150 percent of the stoichiometric amount (amine to epoxide ratio), and in certain embodiments, from 95 percent to 125 percent, of a curing agent or mixture of curing agents.

Coating compositions of the present disclosure can be prepared by mixing a two-component formulation in which a first component comprises at least one amine-terminated polyamide, and a second component comprises at least one epoxy curing agent, prior to application. The first component can comprise an amine-terminated polyamide of the present disclosure dissolved and/or dispersed in a solvent or mixture of solvents, including any of those disclosed herein. The first component can optionally include additives and/or fillers. The solids content of the first component can range from 1 percent to 50 percent based on the total weight of the first component. In certain embodiments, the solids content of the first component can range from 30 percent to 40 percent. The second component can comprise an epoxy curing agent dissolved and/or dispersed in a solvent, and can optionally include fillers and/or additives. The solids content of the second component can range from 1 percent to 10 percent based on the total weight of the second component.

The two components are maintained separately prior to use. Shortly before a coating composition is to be applied to a surface, the two components can be combined in a ratio sufficient to produce a cross-linked cured coating composition that can provide the mechanical, chemical, and/or physical integrity appropriate for the intended use. The appropriate ratio of the two components can also be determined by the desired time to cure, and the stoichiometry of the reactive amine groups of the amine-terminated polyamide and the reactive epoxide groups of the epoxy curing agent. For example, in certain embodiments, the relative amounts of the first and second components used to form coating compositions of the present disclosure can be chosen to provide a ratio of amine-terminated polyamide to epoxy curing agent ranges from 4:1 to 1:10. In certain embodiments, the ratio of amine-terminated polyamide to epoxy curing agent ranges from 4:1 to 1:1, and in certain embodiments, ranging from 2.5:1 to 1.5:1.

Coating compositions can include at least one solvent. A solvent can be an aqueous solvent, an organic solvent, cosolvents, or a mixture thereof. Examples of useful organic solvents include aliphatic solvents, aromatic and/or alkylated aromatic solvents such as toluene, xylene, and SOLVESSO 100, alcohols such as isopropanol, esters, ketones, glycol ethers, glycol ether esters, and mixtures thereof. A solvent can further comprise solubilizing and/or dispersing agents. Any amount of additional solvent can be included in the coating composition as appropriate to facilitate application of the coating composition to a surface.

In certain embodiments, in addition to the solvent included in the components comprising the amine-terminated or epoxy curing agent, a solvent can be used as an additional component which is mixed with the other components just prior to application.

Coating compositions of the present disclosure can comprise one or more dyes and/or pigments to provide color. Coating compositions of the present disclosure can comprise metallic pigments, inorganic pigments, such as titanium dioxide, talc, mica, iron oxides, lead oxides, chromium oxides, lead chromate, and/or carbon black. Coating compositions can include conductive pigments such as conductive carbon black and/or carbon fibrils. Coating compositions of the present disclosure can further comprise other materials well known in the art of formulating surface coatings, such as plasticizers, surfactants, flow control agents, wetting agents, catalysts, agents for controlling and/or modifying the Theological properties of the composition, thixotropic agents, fillers, anti-gassing agents, mildewcides and fungicides, antioxidants, U-V light absorbers, organic co-solvents, additional film-forming polymers, polymeric microparticles, catalysts, and/or other conventional additives. In certain embodiments, these optional solvents, pigments, and/or additives can be present at up to about 40 weight percent based on the total weight of solids of the coating composition. Any of these additives or other additives standard in the art can be included in the first and/or second component of a two-part formulation.

In certain embodiments, selectively strippable intermediate coating compositions of the present disclosure can have a low VOC. For example, in certain embodiments, a coating composition can have a VOC less than 700 g/L, and in certain embodiments, less than 600 g/L.

Coating compositions of the present disclosure can be film-forming compositions. "Film-forming" refers to the property that the coating can form a self-supporting continuous film on at least a horizontal surface of a substrate upon curing and solvent removal at ambient or elevated temperature.

Coating compositions of the present disclosure can be disposed as an intermediate coating between an underlying coating, also referred to herein as a base coat, and an overlying coating to facilitate selective stripping of the overlying coating by a stripper. As such, coating compositions of the present disclosure can be used as selectively strippable intermediate coatings. "Selectively strippable" as used herein refers to the property that, when used as an intermediate coating between an underlying coating and an overlying coating, both the overlying coating and the intermediate coating can be removed when a stripper is applied to the overlying coating without removing the underlying coating. Following application of a stripper to the outer surface of an overlying coating, the stripper can cause the intermediate coating to dissolve and/or swell and detach from the underlying coating. The overlying coating and intermediate coating can then easily be removed, for example, by wiping and/or spraying with a solvent or solution at the same time the stripper is removed. After the overlying coating and intermediate coating have been selectively stripped from the underlying coating, the underlying coating can be treated and one or more new coating layers applied. The ability of a particular coating composition to exhibit selective strippability can be determined, for example, by immersing a coating composition in a stripper for a period of time and measuring the weight gain or loss of the coating composition. Coating compositions exhibiting increased selective strippability will shown a greater weight gain following immersion in a stripper.

In certain embodiments, an underlying coating layer can be a cured primer coating or a cured undercoat. An underlying coating can comprise, for example, an epoxy-amine resin, epoxy-polyamide resin, a polyurethane resin, or other coating composition. Examples of primer coatings include those based on epoxy resins cured with an amino-functional curing agent such as an amino-functional polyamide and/or an araliphatic diamine, and cross-linked polyurethane. A primer coating can include an anticorrosive pigment such as a chromate, phosphate, phosphonate or molybdate and/or may contain one or more other pigments and/or fillers. A primer coating can be applied from a solution or dispersion in an organic solvent or can be a high solids or solventless composition, or can be applied as an aqueous composition. Epoxy-amine based primers include chromate epoxy-amine based primers such as DESOPRIME HS CA 7700/CA, non-chromate primers such as "DeSoto Military Polyamide Primer, 513," and non-chromate water-borne epoxy primers such as "DeSoto Military Water-Borne Primer," each of which is commercially available from PRC-DeSoto International, Inc.

In certain embodiments, an overlying coating can be a top coat, and can comprise a polyurethane resin. A top coat, particularly for aviation and aerospace vehicle coatings, can be a polyurethane such as a polyester-urethane, although other curable coatings such as polyester, fluoropolymer or acrylic polymer coatings, based for example on oxazolidine-functional acrylic polymers, can be used. Examples of polyurethane top coats include any of the DESOTHANE HS CA 8000 polyurethane top coats commercially available from PRC-DeSoto International, Inc. A top coat can be, for example, a curable coating comprising two or three co-reactive components that are usually packaged separately and mixed at application (for example by twin-feed spray) or shortly before application. A top coat can be applied, for example, from an organic solvent solution, from a dispersion in water and/or organic solvent, or from an aqueous solution or dispersion containing solubilizing and/or dispersing agents.

Coating compositions of the present disclosure can be used to form selectively strippable intermediate coatings, and selectively strippable multi-layer coatings. In certain embodiments, a selectively strippable multi-layer coating can be formed by sequentially applying a curable primer coating to a substrate, such as a metal surface of an aviation or aerospace vehicle, curing the primer coating, applying an intermediate coating formed from at least one amine-terminated polyamide of the present disclosure and at least one epoxy curing agent, curing the intermediate coating, and applying and curing a top coat. In certain embodiments, the selectively strippable intermediate coating can be disposed between a coating layer other than a primer coating, and a top coat. For example, a multi-layer coating can include a primer coating, an inner coating layer disposed over the primer coating, a selectively strippable intermediate coating disposed over the inner coating layer, and a top coat disposed over the selectively strippable intermediate coating. In a multi-layer coating, the selectively strippable intermediate coating layer can facilitate selectively stripping of the top coat from the inner coating layer. An inner coating can be, for example, a coating for enhancing interlayer adhesion. The multi-layer coating can include any number of individual coating layers and one or more selectively strippable coatings. In certain embodiments, one or more coating layers can be disposed under or over a particular selectively strippable coating. In certain embodiments, a selectively strippable coating can underlay an adjoining top coat.

An underlying coating or base coat such as a primer coating can be applied to a substrate by any method used by those skilled in the art, and subsequently cured. A selectively strippable coating composition of the present disclosure can be applied to a primer coating after the primer coating becomes "tack free" or "dry to touch". As used herein, "tack free" and "dry to touch" refers to the property that the coating composition is no longer sticky to the touch. In certain embodiments, a selectively strippable coating composition can be applied after an underlying coating, such as a primer coating, has partially or fully cured. Curing times for typical primer coatings can range from 2 hours to 24 hours. A cured primer coating can be treated prior to applying a selectively strippable intermediate coating composition of the present disclosure by any method capable of removing particulates and surface films. For example, in certain embodiments, the surface can be solvent wiped using a lint free fabric retaining a volatile solvent such as ethanol, methanol, naptha, mineral spirits, methyl isobutyl ketone, methyl ethyl ketone, acetone, or other suitable solvents. In certain embodiments, a commercially available cleaning solvent such as DESOCLEAN 120 (PRC-DeSoto International, Inc.) can be used.

A selectively strippable intermediate coating can be applied by any appropriate method depending at least in part on the solvent used and solids content. For example, a selectively strippable intermediate coating can be applied by brushing, spraying, dipping, rolling, flowing, and the like. Spraying methods include compressed air spray and electrostatic spray, and include manual and automatic methods. The low VOC content of the selectively strippable intermediate coating compositions disclosed herein make the compositions particularly appropriate for spray coating.

A selectively strippable intermediate coating can be applied to any appropriate underlying coating that facilitates selective strippability of the top coat and the intermediate coating from the underlying coating. In certain embodiments, the dry film thickness of a selectively strippable intermediate coating can range from 0.05 mils to 1 mil, and in certain embodiments, can range from 0.2 mils to 0.5 mils.

Following application of a selectively strippable intermediate coating to a surface or coating, the intermediate coating can be dried. A selectively strippable intermediate coating can be dried for a period of time sufficient to evaporate the solvent carrier and for the coating to develop adequate adhesion characteristics. Adequate adhesion characteristics generally can develop when a coating becomes "tack free" or "dry to touch". The time to dry a particular selectively strippable intermediate coating can depend, at least in part, on the amount of solvent applied, the thickness of the intermediate coating, the vapor pressure of the solvent, the temperature, the humidity, and/or the airflow at the surface. In certain embodiments, a selectively strippable intermediate coating develops adequate adhesion characteristics when an overlying coating such as a top coat applied over the selectively strippable intermediate coating passes dry and wet adhesion tests. For example, a selectively strippable intermediate coating develops adequate adhesion when a top coat applied over the intermediate coat passes the parallel 45-degree scribe test according to BSS 7225 specification, after the top coat has been cured from 1 hour at room temperature. In certain embodiments, a selectively strippable intermediate coating of the present disclosure is dry when tack free. In certain embodiments, an intermediate coating composition of the present disclosure is dry within 2 hours to 24 hours following application. A top coat can be applied after the selectively strippable intermediate coating develops adequate adhesion that can be at least 18 hours following application of the selectively strippable intermediate coating. After the selectively strippable intermediate coating is dry and has developed adequate adhesion characteristics, for example, when the coating becomes "tack free" or "dry to touch," one or more top coats including, for example, any of those disclosed herein, can be applied to the selectively strippable intermediate coating.

A top coat can be applied to the intermediate coating using any appropriate coating method such as those disclosed herein. Each of the one or more top coats can be applied to any appropriate dry film thickness. For example, in certain embodiments the dry film thickness of a polyurethane top coat can range from 0.25 mils to 5 mils, in certain embodiments from 0.5 mils to 4 mils, and in certain embodiments from 0.5 mils to 2 mils. A top coat can be cured according to recommended procedures, including at ambient temperature. The curing time for a top coat can range, for example, from 4 hours to 7 days.

In certain embodiments, a top coat composition can comprise a curable polyurethane coating composition. It can be useful that top coats used to finish and refinish certain surfaces, such as surfaces on aviation and aerospace vehicles, exhibit hardness, resistance to water and solvents, be easy to apply, and/or result in films having high gloss. Coating compositions comprising a hydroxyl-functional polymer such as a polyester or acrylic polymer and a polyisocyanate can be used for these applications. Two-component polyurethane coating compositions can comprise an organic polyisocyanate in one component, sometimes referred to herein as the "isocyanate component" and a hydroxyl-containing polymer such as a polyester polyol, a polyether polyol or hydroxyl-containing acrylic polymer in a second component. This second component is sometimes referred to herein as the "polyol component". The two components are maintained separate until immediately prior to application. After application, the polyisocyanate and polymeric polyol react to form a cured polyurethane coating. The reaction between the hydroxyl-functional polymer and the polyisocyanate can occur at room temperature, and catalysts can be added to speed the reaction. Other constituents such as pigments, solvents, catalysts, additives, and the like can be formulated into either of the two components. Two-component polyurethane coatings and adhesives are known (see U.S. Pat. No. 4,341,689, for example) and are commercially available. An example of a commercially available two-component polyurethane coating composition is DESOTHANE CA 8000 (PRC-DeSoto International, Inc., Burbank, Calif.).

Single-component moisture curing polyurethane compositions can also be used to produce high quality coatings. Moisture curing polyurethane polymers can be prepared by reacting a stoichiometric excess of an organic polyisocyanate with a polymeric polyol, such as a polyester polyol, a polyether polyol or a hydroxyl-containing acrylic polymer to form a polyisocyanate polymer. The polyisocyanate polymer can be formulated with solvents, pigments, additives, and the like to form the coating composition. An example of a commercially available moisture-cured polyurethane coating is DESMODUR E polyisocyanate (Bayer Corporation, Pittsburgh, Pa.).

Two-component and single-component polyurethane coating compositions can be provided as either an aqueous-based or organic solvent-based formulation. In certain embodiments, the organic solvent can be an aliphatic or aromatic hydrocarbon such as toluene or xylene, an alcohol such as butanol or isopropanol, an ester such as butyl acetate or ethyl acetate, a ketone such as acetone, methyl isobutyl ketone, or methyl ethyl ketone, an ether, an ether-alcohol or an ether-ester, or a mixture of any of the foregoing. A polyurethane coating composition can comprise a single type of polyurethane polymer, or can comprise a mixture of different types of polyurethane polymers.

After the top coat has cured, the top coat adheres to the intermediate coating. When the top coat is treated with a stripper, the top coat and selectively strippable intermediate coating swells, followed by detachment of the selectively strippable intermediate coating and top coat from the underlying coating such as a primer coating. The top coat and selectively strippable intermediate layer can then lift off the primer coating and can fall away and/or can be removed, for example, by low-pressure water spraying. The top coat and selectively strippable intermediate coating can be removed within a time that is generally 10 minutes to 5 hours and usually 0.5 hours to 2 hours after application of the stripper, without any removal of the primer. The primer coating may be swollen or discolored by the paint stripper, but can resist removal with the top coat and continues to adhere to the substrate. Selectively strippable intermediate coatings of the present disclosure facilitate stripping a top coat when all or only a portion of the top coat treated with a stripper can be removed.

Strippers used to strip aviation and aerospace vehicle coatings, and in particular polyurethane top coats, can be aqueous thickened mixtures of benzyl alcohol and formic acid. Alternative strippers include alkaline thickened aqueous benzyl alcohol or strippers based on methylene chloride and phenol that are primarily used to strip certain fluoropolymer and acrylic top coats. Examples of commercially available benzyl alcohol strippers include E-2012A (commercially available from CeeBee Aviation Products), a composition comprising 30 percent to 50 percent benzyl alcohol, 0.5 percent to 5 percent sodium silicate, 5 percent to 15 percent anisole, and 0.5 percent to 5 percent naphtha solvent and TURCO 1270-5 (commercially available from ELF Atochem). Non-benzyl alcohol-based strippers can also be used with selectively strippable coating compositions of the present disclosure. For example, ethyl cellulose-based stripper such as EFS-2500 commercially available from Molecular-Tech Coatings, Inc., BC, Canada.

Adhesion of a multilayer coating comprising at least one polyurethane top coat and a selectively strippable intermediate coating can be determined by any appropriate method. For example, adhesion can be determined using the Dry Adhesion Test, 7-Day Wet Adhesion Test, and/or 36-Day Wet Adhesion Test according to BSS 7225 (Boeing Specification Support Standard). The Whirling Arm Rain Erosion Resistance Test (BSS 7225) can also be used to evaluate the adhesion characteristics of the coatings. The solvent resistance of a multilayer coating can be determined using, for example, Skydrol solvent resistance test (BMS3-11). The foregoing test methods are described herein.

EXAMPLES

Embodiments of the present disclosure can be further defined by reference to the following examples, which describe in detail preparation of compounds and compositions of the present disclosure and assays for using compounds and compositions of the present disclosure. It will be apparent to those skilled in the art that many modifications, both to materials and methods, may be practiced without departing from the scope of the present disclosure.

Adhesion Tests

The adhesion of the coatings, interlayers, top coats and multilayer coatings disclosed herein were evaluated using dry adhesion, wet adhesion, and whirling arm rain erosion resistance test methods.

The adhesion of polyurethane coatings disclosed herein was evaluated using the procedures described in BSS 7225 (Boeing Specification Support Standard). In the Dry Adhesion Test (Type I) test, specimens were scribed with a stylus, for example, to produce two parallel scribes separated by 1 inch, and a single scribe intersecting the parallel scribes at an angle of 45±5 degrees (BSS 7225, Parallel Plus 45 Degree Scribes—Class 3). A 1-inch wide masking tape having rubber or acrylic adhesive with a minimum peel strength of 60 oz/inch width when tested in accordance with ASTM D 330, Method A, was pressed onto the surface of the scribed test specimen perpendicular to the parallel scribes and covering the 45 degree scribe in the region between the parallel scribes. In a single abrupt motion, the tape was pulled perpendicular to the test specimen. The tested area and the tape were then examined for any removed coating. A coating that passed the adhesion test exhibited no, or very slight, loss of coating beyond the scribes, as indicated by classifications 10 and 9, respectively, in BSS 7225. Classification 10 corresponds to no loss of paint along the scribes, and classification 9 corresponds to very slight loss of paint beyond the scribes. Adhesion failure was indicated for results corresponding to classifications 8 through 1 as defined in BSS 7225.

The wet adhesion of the interlayer and top coats was evaluated using the procedure described in BSS 7225, Wet Adhesion, Immersion Method (Type III). Test specimens were immersed in distilled water for either 7 days or 36 days. At the end of the specified time, the test specimens were removed from the water, wiped dry, and the adhesion of the coating evaluated as described for the dry adhesion test.

The adhesion of the interlayers and top coats was also evaluated using the Whirling Arm Rain Erosion Resistance Test. Aluminum 2024-T3 test panels in the shape of a curved foil with dimensions of 3 in×6 in×0.032 in were pretreated with a chromate conversion coating according to MIL-C-5541 Class 1A. Test panels were then solvent wiped and dried prior to application of coatings. After the coatings were applied and dried, the test panels were immersed in water at 25° C. for 16 h to 24 h prior to testing. Within one hour after removal from the water, the test panels were secured to a whirling arm fixture. The specimens were then exposed to 385 mile per hour, 3 in to 4 in per hour water spray, characterized by a 1 mm to 4 mm drop size, for 30 min. Failure was indicated when any coating peeled more than 0.25 in from the leading edge of the test panel.

Skydrol Solvent Resistance Test

The Skydrol Solvent Resistance Test is performed by immersing a test panel having a multilayer coating in Skydrol jet aviation fuel (LD4 or 500B) for a minimum of 30 days at 70° C. The test panel having a multilayer coating is removed, and dried. The pencil hardness of the multilayer coating is then measured. A multilayer coating passes the Skydrol Solvent Resistance Test when the pencil hardness is at least "H".

Example 1

An amine-terminated polyamide was formed by reacting dimethyl adipate with 2-methylpentamethylene diamine as shown in Scheme 5:

Scheme 5

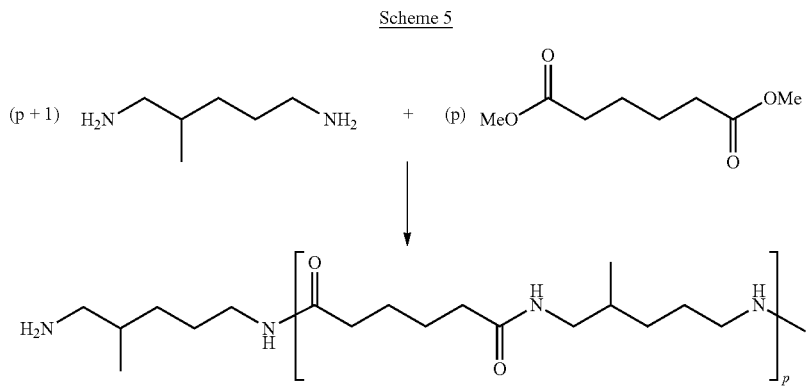

where Me represents a methyl group and p can be an integer from 3 to 17, and in certain embodiments p was 8 or 9.

33.47 grams (28.8 mmol) of 2-methylpentamethylenediamine (DYTEK A Amine commercially available from DuPont) and 45.99 g (26.4 mmol) of dimethyl adipate (DBE-6 commercially available from DuPont) were mixed at a temperature from 140° C. to 170° C. for 3 hours. After 3 hours, 15.06 g of fluid was removed. The mixture was reacted for an additional 3 hours at a temperature of 180° C. to 210° C., at which time an additional 0.2 g of fluid was removed. The amine-terminated polyamide was degassed and a temperature of 200° C. to 210° C. for 1 h. The progress of the reaction was monitored by measuring the amine equivalent weight of the reaction product at various time intervals by nitrogen titration. A 15 percent by weight solution of the amine-terminated polyamide in isopropanol exhibited a viscosity less than 1 poise.

Example 2

To form an intermediate coating composition capable of facilitating the selective removal of a polyurethane top coat using a benzyl alcohol-based stripper, the amine-terminated polyamine prepared in Example 1 was combined with bisphenol-A epoxy curing agent from a two-component system. A dispersion of the amine-terminated polyamide was prepared by combining 15 percent by weight of the amine-terminated polyamide prepared in Example 1 with 55 percent by weight of a solvent blend, and 30 percent by weight of fillers to form the first component. A dispersion of a epoxy curing agent was prepared by dispersing 12.3 percent by weight of epoxy curing agent with 87.7 percent by weight of a solvent blend to form the second component. The intermediate coating composition was prepared by combining 10 parts by volume of the first component with 1 part by volume of the second component. The viscosity of the intermediate coating composition thus formed was 19 sec (BMS 10-72). The intermediate coating composition had a VOC of 580 g/L. The intermediate coating composition had a useful pot life greater than 24 h. After applying to a surface, the intermediate coating was dry to overcoat after about 18 h at ambient temperature and humidity, and was fully cured after 7 days.

Example 3

Abraded aluminum 2024-T3 test panels were first coated with a DESOPRIME HS CA 7700/CA 7755 epoxy primer C (commercially available from PRC-DeSoto International, Inc.) and cured at 50° C. for at least 6 h. The epoxy primer coatings were then treated using a methylethyl ketone ("MEK") or DESOCLEAN 120 (commercially available from PRC-DeSoto International) solvent wipe. An intermediate coating composition prepared by combining 10 parts by volume of the amine-terminated polyamide component described in Example 2 to 1 parts epoxy curing agent component were combined and thoroughly mixed. After allowing the coating composition to set to form a film for at least 5 to 10 min, the intermediate coating composition was spray coated on the epoxy primer coating to a dry film thickness ranging from 0.2 mil to 0.25 mil. The intermediate coating composition was cured at 25° C. for at least 18 h. After the intermediate coating was cured, a CA 8000 polyurethane top coat (commercially available from PRC-DeSoto International) was applied, and cured for at least 7 days before being tested for integrity, chemical resistance, and strippability.

The cured multi-layer coating passed the Dry Adhesion (BSS 7225, Pass 10), Impact Resistance (Pass, 80 in forward/backward), Water Resistance (30 days at 25° C. (BSS 7225), Pass 9) and Skydrol Resistance (30 days at 70° C., pencil hardness of H, scratch resistance 1,400 g) tests.

Some of the coated test panels were treated with TURCO 1270-5 benzyl alcohol-based stripper. After 30 minutes the top coat and intermediate coating swelled and lifted off the primer coating. The top coat, intermediate coating, and stripper were then removed using a low-pressure water wash, leaving the intermediate coating intact.

Some of the coated test panels were treated with E-2012A benzyl alcohol-based stripper. After 90 minutes the top coat and intermediate coating had swelled and lifted off the primer coating. The top coat, intermediate coating, and stripper were then removed using a low-pressure water wash, leaving the epoxy primer coating intact.

Example 4

Using the procedures described in Example 3, the use of the coating composition described in Example 2 as a selectively strippable intermediate coating was evaluated using the primer coating types listed in Table 1, each of which is commercially available from PRC-DeSoto International, Inc. The cured multi-layer coatings passed the Dry Adhesion (BSS 7225, Pass 10), Impact Resistance (Pass, 80 in forward/backward), Water Resistance (30 days at 25° C. (BSS 7225), Pass 9) and Skydrol Resistance (30 days at 70° C., pencil hardness of H, scratch resistance 1,400 g) tests. The top coat and intermediate coating were selectively strippable 30 minutes after being treated with a benzyl alcohol-based stripper.

TABLE 1

| Primer | Description Specification |
|---|---|
| DESOPRIME HS CA 7700/ CA 7500 | chromate epoxy primer BMS 10-72 BMS 10-79 |
| DESOPRIME CF/CA 7501 | non-chromate epoxy primer BMS 10-72 BMS 10-79 |
| DESOTO 512 × 310 | non-chromate epoxy primer BMS 10-132A Type I |
| DESOTO 513 × 377 | chromate epoxy primer BMS 10-79 Type II, Class A |
| BMS 10-11 Grade E | Type I, corrosion inhibiting VOC ≤ 350 g/L water reducible |
| BMS 10-11 Grade A | Type I, corrosion inhibiting VOC 600-650 g/L |

Other embodiments of the present disclosure will be apparent to those skilled in the art from consideration of the specification and practice of the present disclosure. It is intended that the specification and examples be considered as exemplary only, with a true scope and spirit of the present disclosure being indicated by the following claims.

What is claimed is:

1. A solvent borne coating composition comprising an organic solvent and at least one amine-terminated polyamide dispersed therein wherein the number average molecular weight of the amine-terminated polyamide ranges from 500 Daltons to 100,000 Daltons, wherein the at least one amine-terminated polyamide has the structure of Formula (I):

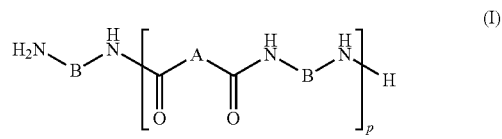

wherein
each A is independently chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene $C_{6-24}$ heteroarylalkylene, and substituted $C_{6-24}$ heteroarylalkylene;

each B is independently chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene $C_{6-24}$ heteroarylalkylene, and substituted $C_{6-24}$ heteroarylalkylene; and p is an integer chosen such that the number average molecular weight of the at least one amine-terminated polyamide ranges from 500 Daltons to 100,000 Daltons, wherein the volatile organic content of the coating composition is less than 700 g/L.

2. The coating composition of claim 1, wherein the number average molecular weight of the at least one amine-terminated polyamide ranges from 500 Daltons to 25,000 Daltons.

3. The coating composition of claim 1, wherein the number average molecular weight of the at least one amine-terminated polyamide ranges from 500 Daltons to 5,000 Daltons.

4. The coating composition of claim 1, wherein each A is independently chosen from $C_{2-12}$ alkylene, substituted $C_{2-12}$ alkylene, $C_{2-12}$ heteroalkylene, and substituted $C_{2-12}$ heteroalkylene.

5. The coating composition of claim 1, wherein each A is independently chosen from $C_{2-12}$ alkylene, and $C_{2-12}$ heteroalkylene.

6. The coating composition of claim 1, wherein each A is independently chosen from $-NH-R^6-NH-$, and $-NH-R^6-$ wherein $R^6$ is chosen from $C_{1-8}$ alkylene.

7. The coating composition of claim 1, wherein the at least one substituent group is chosen from $C_{1-6}$ alkyl, halo, cyano, and sulfonyl.

8. The coating composition of claim 1, wherein each B is independently chosen from $C_{2-12}$ alkylene, substituted $C_{2-12}$ alkylene, $C_{2-12}$ heteroalkylene, and substituted $C_{2-12}$ heteroalkylene.

9. The coating composition of claim 1, wherein each B is independently chosen from substituted $C_{2-12}$ alkylene having at least one $C_{1-6}$ alkyl substituent group.

10. The coating composition of claim 1, wherein the at least one amine-terminated polyamide is formed by reacting at least one diamine monomer with at least one dibasic monomer.

11. The coating composition of claim 10, wherein the at least one dibasic monomer has the structure of Formula (III):

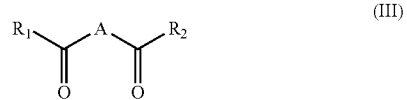

(III)

wherein
$R^1$ and $R^2$ are independently chosen from halogen, $-OH$, $-OR^3$, $-NH_2$, and $-NR^4R^5$; wherein
$R^3$ is independently chosen from $C_{1-6}$ alkyl, substituted $C_{1-6}$ alkyl, $C_{1-6}$ heteroalkyl, and substituted $C_{1-6}$ heteroalkyl; and $R^4$ and $R^5$ are independently chosen from H, $C_{1-10}$ alkyl, substituted $C_{1-10}$ alkyl, $C_{1-10}$ heteroalkyl, and substituted $C_{1-10}$ heteroalkyl; and A is chosen from $C_{2-12}$ alkylene, substituted $C_{2-12}$ alkylene, $C_{2-2}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene, $C_{6-24}$ heteroarylalkylene, and substituted $C_{6-24}$ heteroarylalkylene.

12. The coating composition of claim 11, wherein $R^1$ and $R^2$ are $-OH$, $R^1$ and $R^2$ are $-OCH_3$, or $R^1$ and $R^2$ are $-NH_2$.

13. The coating composition of claim 11, wherein A is chosen from $C_{2-10}$ alkylene, substituted $C_{2-10}$ alkylene, $C_{2-10}$ heteroalkylene, and substituted $C_{2-10}$ heteroalkylene.

14. The coating composition of claim 11, wherein A is chosen from $C_{2-10}$ alkylene, and $C_{2-10}$ heteroalkylene.

15. The coating composition of claim 11, wherein A is chosen from $-NH-R^6-NH-$, and $-NH-R^6-$ wherein $R^6$ is chosen from $C_{1-8}$ alkylene.

16. The coating composition of claim 11, wherein the at least one substituent group is chosen from $C_{1-6}$ alkyl, halo, amino, cyano, and sulfonyl.

17. The coating composition of claim 10, wherein the dibasic monomer is chosen from a dibasic ester.

18. The coating composition of claim 17, wherein the dibasic ester is chosen from dimethyl adipate, dimethyl glutarate, and dimethyl succinate.

19. The coating composition of claim 10, wherein the diamine monomer has the structure of Formula (IV):

(IV)

wherein B is chosen from $C_{2-10}$ alkylene, substituted $C_{2-10}$ alkylene, $C_{2-10}$ heteroalkylene, substituted $C_{2-10}$ heteroalkylene, $C_{5-10}$ arylene, substituted $C_{5-10}$ arylene, $C_{5-10}$ heteroarylene, substituted $C_{5-10}$ heteroarylene, $C_{5-10}$ cycloalkylene, substituted $C_{5-10}$ cycloalkylene, $C_{5-10}$ heterocycloalkylene, substituted $C_{5-10}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene, $C_{6-24}$ heteroarylalkylene, and substituted $C_{6-24}$ heteroarylalkylene.

20. The coating composition of claim 19, wherein B is chosen from $C_{2-10}$ alkylene, substituted $C_{2-10}$ alkylene, $C_{2-10}$ heteroalkylene, and substituted $C_{2-10}$ heteroalkylene.

21. The coating composition of claim 19, wherein B is chosen from substituted $C_{2-10}$ alkylene having at least one $C_{1-6}$ alkyl substituent group.

22. The coating composition of claim 10, wherein the at least one diamine monomer is chosen from $C_{2-8}$ alkylene diamine, and substituted $C_{2-8}$ alkylene diamine.

23. The coating composition of claim 10, wherein the at least one diamine monomer is chosen from methyl substituted alkylene diamine.

24. The coating composition of claim 10, wherein the diamine monomer is chosen from 2-methylpentamethylenediamine, 1,2 diamine, and aminoethyl piperazine.

25. The coating composition of claim 10, wherein the diamine monomer is 2-methylpentamethylenediamine, and the diester monomer is dimethyl adipate.

26. The coating composition of claim 1, further comprising at least one epoxy curing agent.

27. The coating composition of claim 26, wherein the epoxy curing agent is chosen from glycidyl ethers of bisphenol A, hydantoin diepoxides, diglycidyl ethers of bisphenol-F, novalac-type epoxies, and mixtures thereof.

28. The coating composition of claim 1, wherein the organic solvent is chosen from isopropanol, 1-propanol, and/or ethanol.

29. The coating composition of claim 1, wherein the coating composition further comprises at least one of the following: a pigment, a filler, and an additive.

30. The coating composition of claim 1, wherein the resin solids content of the coating composition ranges from 1 percent to 50 percent, based on the total weight of the coating composition.

31. The coating composition of claim 1, wherein the resin solids content of the coating composition ranges from 30 percent to 40 percent, based on the total weight of the coating composition.

32. A multi-layer coating comprising:
a first coating;
a second coating; and
an intermediate coating disposed between the first coating and second coating, wherein the intermediate coating is deposited from a solvent borne coating composition comprising an organic solvent and at least one amine-terminated polyamide dispersed therein having the structure of Formula (I) or Formula (II):

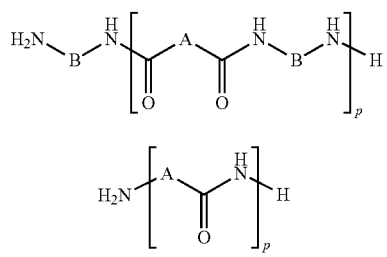

wherein
each A is independently chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene $C_{6-24}$ heteroarylalkylene, and substituted $C_{6-24}$ heteroarylalkylene;

each B is independently chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene $C_{6-24}$ heteroarylalkylene, and substituted $C_{6-24}$ heteroarylalkylene; and p is an integer chosen such that the number average molecular weight of the at least one amine-terminated polyamide ranges from 500 Daltons to 100,000 Daltons and wherein the volatile organic content of the coating composition is less than 700 g/L.

33. The multi-layer coating of claim 32, wherein the intermediate coating further comprises at least one epoxy curing agent.

34. The multi-layer coating of claim 32, wherein the intermediate coating is selectively strippable in the presence of a stripper.

35. The multi-layer coating of claim 34, wherein the stripper is chosen from a benzyl alcohol-based stripper.

36. The multi-layer coating of claim 32, wherein the first coating is chosen from an epoxy-amine based primer coating.

37. The multi-layer coating of claim 32, wherein the second coating is chosen from a polyurethane-based top coat.

38. The multi-layer coating of claim 32, wherein the dry film thickness of the intermediate coating ranges from 0.05 mils to 1 mil.

39. The multi-layer coating of claim 32, wherein the dry film thickness of the intermediate coating ranges from 0.2 mils to 0.5 mils.

40. The multi-layer coating of claim 32, wherein the at least one amine-terminated polyamide is formed by reacting at least one dibasic monomer and at least one diamine monomer.

41. The multi-layer coating of claim 32, wherein the multi-layer coating passes the whirling arm rain erosion resistance test according to BSS 7225 specification.

42. The multi-layer coating of claim 32, wherein the multi-layer coating passes the whirling arm rain erosion resistance test according to BSS 7225 specification, dry adhesion test, wet adhesion test, impact resistance test, and hot Skydrol resistance test.

43. A method of forming a multi-layer coating comprising:
applying a curable first coating to a substrate;
drying the first coating;
applying an intermediate coating to the first coating;
drying the intermediate coating; and
applying a curable top coat to the intermediate coating;
wherein the intermediate coating comprises a solvent borne coating composition comprising an organic solvent and at least one amine-terminated polyamide dispersed therein, wherein the number average molecular weight of the at least one amine-terminated polyamide ranges from 500 Daltons to 100,000 Daltons, wherein the at least one amine-terminated polyamide has the structure of Formula (I):

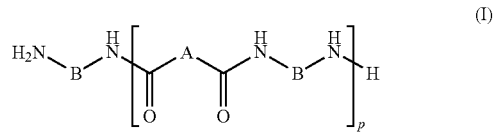

wherein
each A is independently chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene $C_{6-24}$ heteroarylalkylene, and substituted $C_{6-24}$ heteroarylalkylene;

each B is independently chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene $C_{6-24}$ heteroarylalkylene, and substituted $C_{6-24}$ heteroarylalkylene; and p is an integer chosen such that the number average molecular weight of the at least one amine-terminated polyamide ranges from 500 Daltons to 100,000 Daltons, wherein the solvent borne coating composition is characterized by a volatile organic content less than 700 g/L.

44. The method of claim 1, wherein the intermediate coating further comprises at least one epoxy curing agent.

45. The method of claim 43, further comprising applying at least one undercoat to the at least dried first coating, and at least drying the at least one undercoat before applying the intermediate coating.

46. The method of claim 43, wherein the intermediate coating facilitates selective stripping of the top coat when a stripper is applied to the top coat.

47. The method of claim 46, wherein the stripper comprises a benzyl alcohol-based stripper.

48. The method of claim 43, wherein the substrate is a surface of an aviation or aerospace vehicle.

49. The method of claim 43, wherein the first coating is chosen from an epoxy-amine based primer coating.

50. The method of claim 43, wherein the top coat is chosen from a polyurethane-based coating.

51. The method of claim 43, wherein the at least one amine-terminated polyamide is formed by reacting at least one dibasic monomer and at least one diamine monomer.

52. A method of overcoating a base coat with a curable top coat comprising:
applying an intermediate coating to the base coat;
at least drying the intermediate coating;
applying a top coat to the intermediate coating; and
curing the top coat,
wherein the intermediate coating facilitates removing the top coat from the base coat by a stripper;
wherein the intermediate coating comprises a solvent borne coating composition comprising an organic solvent and at least one amine-terminated polyamide dispersed therein, wherein the number average molecular weight of the at least one amine-terminated polyamide ranges from 500 Daltons to 100,000 Daltons, wherein the at least one amine-terminated polyamide has the structure of Formula (I):

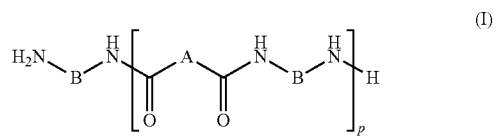

wherein
each A is independently chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene $C_{6-24}$ heteroarylalkylene, and substituted $C_{6-24}$ heteroarylalkylene;

each B is independently chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene $C_{6-24}$ heteroarylalkylene, and substituted $C_{6-24}$ heteroarylalkylene; and p is an integer chosen such that the number average molecular weight of the at least one amine-terminated polyamide ranges from 500 Daltons to 100,000 Daltons, wherein the solvent borne coating composition is characterized by a volatile organic content less than 700 g/L.

53. The method of claim 52, wherein the intermediate coating further comprises at least one epoxy curing agent.

54. The method of claim 52, wherein the base coat is chosen from a primer coating.

55. A method of treating a substrate having a cured base coat to facilitate removal by a stripper of a subsequently applied top coat, comprising applying an intermediate coating to the cured base coat;
wherein the intermediate coating comprises a solvent borne coating composition comprising an organic solvent and at least one amine-terminated polyamide dispersed therein, wherein the number average molecular weight of the at least one amine-terminated polyamide ranges from 500 Daltons to 100,000 Daltons, wherein the at least one amine-terminated polyamide has the structure of Formula (I):

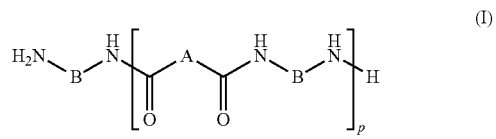

wherein
each A is independently chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene $C_{6-24}$ heteroarylalkylene, and substituted $C_{6-24}$ heteroarylalkylene;

each B is independently chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene $C_{6-24}$ heteroarylalkylene, and substituted $C_{6-24}$ heteroarylalkylene; and p is an integer chosen such that the number average molecular weight of the at least one amine-terminated polyamide ranges from 500 Daltons to 100,000 Daltons, wherein the solvent borne coating composition is characterized by a volatile organic content less than 700 g/L.

56. The method of claim 55, wherein the intermediate coating further comprises at least one epoxy curing agent.

57. The method of claim 55, wherein the base coat is chosen from a primer coating.

58. The method of claim 55, wherein the top coat is chosen from a polyurethane-based coating.

59. A multi-layer coating comprising:

a first coating;

a second coating; and an intermediate coating disposed between the first coating and second coating, wherein the intermediate coating comprises a film-forming resin consisting essentially of an epoxy curing agent and an amine-terminated polyamide having the structure of Formula (I) or Formula (II):

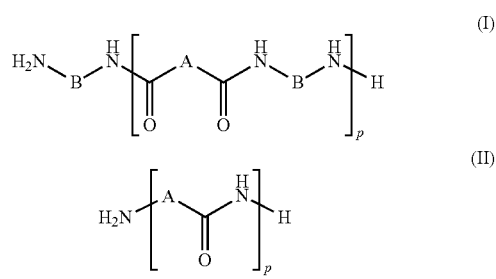

wherein each A is independently chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene $C_{6-24}$ heteroarylalkylene, and substituted $C_{6-24}$ heteroarylalkylene;

each B is independently chosen from $C_{2-12}$ alkylene, substituted $C_{2-12}$ alkylene, $C_{2-12}$ heteroalkylene, substituted $C_{2-12}$ heteroalkylene, $C_{5-12}$ arylene, substituted $C_{5-12}$ arylene, $C_{5-12}$ heteroarylene, substituted $C_{5-12}$ heteroarylene, $C_{5-12}$ cycloalkylene, substituted $C_{5-12}$ cycloalkylene, $C_{5-12}$ heterocycloalkylene, substituted $C_{5-12}$ heterocycloalkylene, $C_{6-24}$ cylcloalkylalkylene, substituted $C_{6-24}$ cycloalkylalkylene, $C_{6-24}$ heterocycloalkylalkylene, substituted $C_{6-24}$ heterocycloalkylalkylene, $C_{6-24}$ arylalkylene, substituted $C_{6-24}$ arylalkylene $C_{6-24}$ heteroarylalkylene, and substituted $C_{6-24}$ heteroarylalkylene; and p is an integer chosen such that the number average molecular weight of the at least one amine-terminated polyamide ranges from 500 Daltons to 100,000 Daltons.

\* \* \* \* \*